US005877726A

United States Patent [19]
Kudoh et al.

[11] Patent Number: 5,877,726
[45] Date of Patent: Mar. 2, 1999

[54] ANTENNA DEVICE

[75] Inventors: Hiroshi Kudoh; Hiroshi Uematsu; Jun Ashihara, all of Wako, Japan

[73] Assignee: Honda Giken Kogyo Kabushiki Kaisha, Tokyo, Japan

[21] Appl. No.: 932,017

[22] Filed: Sep. 17, 1997

[30] Foreign Application Priority Data

Sep. 18, 1996 [JP] Japan .................................... 8-246547

[51] Int. Cl.[6] .............................. H01Q 1/38; G01S 13/93

[52] U.S. Cl. .................................. 343/700 MS; 343/853; 342/70; 342/175

[58] Field of Search ................................ 342/175, 70, 71, 342/72; 343/700 MS, 893, 853, 711; H01Q 1/38; G01S 13/93

[56] References Cited

U.S. PATENT DOCUMENTS 5,717,399 2/1998 Urabe et al. .............................. 342/70
5,724,042 3/1998 Komatsu et al. .......................... 342/70

FOREIGN PATENT DOCUMENTS 8-097620A 4/1996 Japan .

*Primary Examiner*—Hoanganh Le
*Assistant Examiner*—Kimnhung Nguyen
*Attorney, Agent, or Firm*—Lyon & Lyon LLP

[57] ABSTRACT

An antenna device of the type including an array antenna comprised of a plurality of planar antenna elements, wherein the planar antenna elements are arranged in a staggered pattern such that two adjacent ones of the antenna elements are disposed diagonally with each other. With this staggered arrangement, the spacing between the adjacent antenna element becomes larger than that in a conventional matrix arrangement, whereby the interference between the adjacent planar antenna elements is considerably reduced, while the antenna efficiency of the planar antenna elements is improved.

7 Claims, 4 Drawing Sheets

ANTENNA DEVICE

BACKGROUND OF THE INVENTION

1. Field of the Invention

The present invention relates generally to an antenna device having an array antenna comprised of a plurality planar antennas, and more particularly to such an antenna device having a high antenna efficiency.

2. Description of the Related Art

Japanese Patent Laid-open Publication No. HEI 8-97620 discloses a multiple-beam planar array antenna comprised of a plurality of patch antennas (planar antennas) arranged over one surface of a dielectric substrate, a feeder part or unit, and feeder lines connecting the feeder unit and the individual patches antennas. The patch antennas are arranged so as to form a plurality of antenna parts each of which radiates beams of different tilt angles that are determined depending on the differences in length of the feeder lines connected to the individual patch antennas. The feeder lines are provided with a feed selecting means for selectively starting and stopping the feed of radio frequency energy to each of the antenna parts. The feed selecting means is composed of a plurality of selectively switchable PIN diodes.

In the disclosed antenna device, however, since the patch antennas (planar antennas) are arranged in the form of a matrix or rectangular array, the adjacent planar antennas tend to cause interference during transmission and reception of electromagnetic waves, thereby lowering the antenna efficiency (radiating efficiency) of the antenna device.

SUMMARY OF THE INVENTION

With the foregoing drawback in view, it is an object of the present invention to provide an antenna device including an array antenna which is substantially free from interference and, hence, is able to provide a high antenna efficiency.

According to the present invention, there is provided an antenna device, comprising: an array antenna comprised of a plurality of transmitting planar antenna elements and a plurality of receiving planar antenna elements; a transmission selecting circuit for selecting at least one of the transmitting planar antenna elements; a transmitting circuit for transmitting an electric signal to the selected at least one transmitting planar antenna element via the transmission selecting circuit; a reception selecting circuit for selecting at least one of the receiving planar antenna elements; and a receiving circuit for receiving a received electric signal from the selected at least one receiving planar antenna element via the reception selecting circuit, wherein the transmitting planar antenna elements and the receiving planar antenna elements are arranged in staggered relation such that each of the transmitting planar antenna elements and an adjacent one of the receiving planar antenna elements are disposed diagonally with each other.

In the staggered arrangement, two diagonally adjacent planar antenna elements come close to each other. On the other hand, in a conventional matrix arrangement, two horizontally or vertically juxtaposed planar antenna elements come close to each other, and the spacing between the juxtaposed antenna elements is smaller than the spacing between two diagonally adjacent antenna elements. This means that the spacing (center distance) between two diagonally adjacent ones of the antenna elements arranged in a staggered pattern is larger than that of the adjacent planar antenna elements arranged in the conventional matrix pattern. With this large antenna spacing, it is possible to reduce the interference between the adjacent planar antenna elements and improve the antenna efficiency of the planar antenna elements.

In one preferred form of the present invention, the transmitting and receiving planar antenna elements are each composed of a rectangular patch antenna.

Since the adjacent rectangular patch antennas (planar antenna elements) come close to each other at corners alone, it becomes possible to enlarge the spacing between the adjacent antenna elements and thus reduce the interference between the adjacent antenna elements, as compared to the case of the conventional matrix arrangement in which the adjacent rectangular patches (planar antenna elements) come close to each other not only along sides but also at corners.

The transmitting planar antenna elements may be arranged in rows, and the transmitting planar antenna elements in each transmitting antenna row are connected in series by a single feeder line for enabling series feeding of the electric signal. In this instance, the receiving planar antenna elements are arranged in rows, and the receiving planar antenna elements in each receiving antenna row are connected in series by a single feeder line for enabling series feeding of the received signal. The patch spacing between one of the transmitting planar antenna elements in each transmitting antenna row and an adjacent one of the receiving planar antenna elements in each receiving antenna row ranges preferably from about 4% to about 8% of a free space wavelength corresponding to a frequency of the electric signal.

By virtue of the symmetrical arrangement of the planar antenna elements and the associated feeder lines, all of the (transmitting and receiving) antenna element rows have uniform characteristics. In addition, owing to the patch (antenna) spacing specified above, it is possible to maintain a desired high level of antenna integration density of the array antenna and reduce the leakage of radio frequency wave energy (represented by the electric signal) from one transmitting planar antenna element to an adjacent receiving planar antenna element, thereby increasing the antenna efficiency of the array antenna.

It is preferable that the transmission selecting circuit is connected to the transmitting circuit by a feeder line having a plurality of branched portions and includes a PIN diode array comprised of a plurality of PIN diodes each disposed on a corresponding one of the branched portions of the feeder line. Similarly, the reception selecting circuit is preferably connected to the receiving circuit by a feeder line having a plurality of branched portions and includes a PIN diode array comprised of a plurality of PIN diodes each disposed on a corresponding one of the branched portions of the feeder line.

The PIN diodes, when they are turned ON and OFF by switching between forward bias and reverse bias, can be used as switches. By virtue of the symmetrically branched hierarchical structure of the PIN diode array, the PIN diodes in the array have uniform harmonic characteristics. Since each of the PIN diodes is disposed on a respective one of the branched portions of the feeder line extending from the transmitting/receiving circuit, selected one or more transmitting/receiving antenna elements can be activated by switching the PIN diode on a corresponding branch portion ON and OFF. Furthermore, since the lengths of the respective feeder lines extending between the transmitting or receiving circuit and the individual transmitting or receiving planar antenna elements are substantially uniform, a transmitting or a received signal between the respective planar antenna elements and the transmitting or receiving circuit can be transmitted or received in the same phase via the same number of PIN diodes.

The above and other objects, features and advantages of the present invention will become more apparent from the following description when making reference to the detailed description and the accompanying sheets of drawings in which a preferred structural embodiment incorporating the principles of the present invention is shown by way of illustrated example.

DETAILED DESCRIPTION OF THE PREFERRED EMBODIMENT

The present invention will be described below in greater detail with reference to a preferred embodiment shown in the accompanying sheets of drawings.

Figure 1:
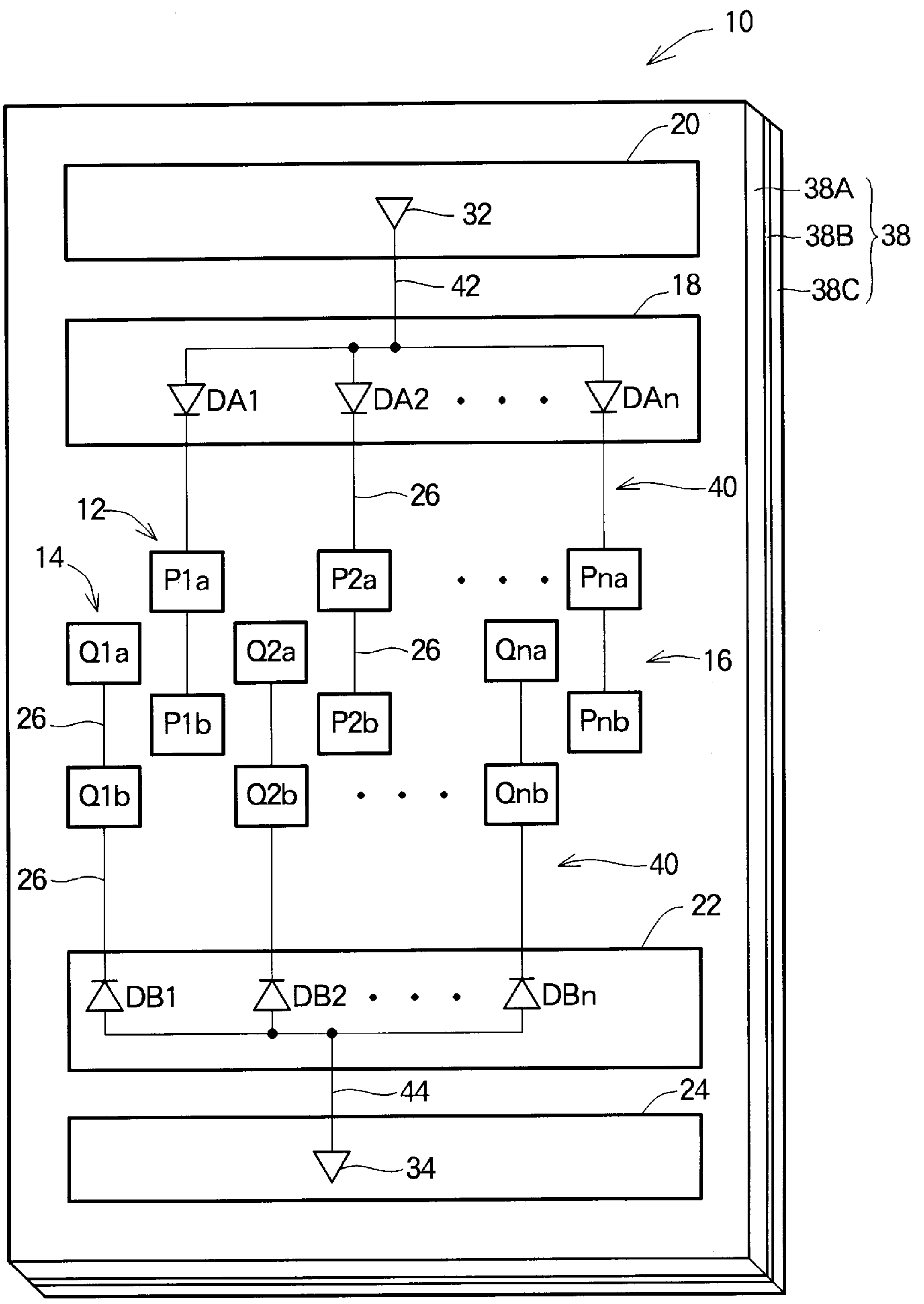
FIG. 1 is a diagrammatical perspective view showing the general construction of an antenna device according to the present invention.

FIG. 1 shows an antenna device 10 embodying the present invention. The antenna device 10 generally comprises an array antenna 16 comprised of a plurality of transmitting planar antenna elements 12 and a plurality of receiving planar antenna elements 14 that are arranged in a predetermined pattern (described later in greater detail), a transmission selecting circuit 18 for selecting at least one of the transmission planar antenna elements 12 of the array antenna 16, a transmitting circuit 20 for transmitting an electric signal to the selected transmitting planar antenna element 12 via the transmission selecting circuit 18, a reception selecting circuit 22 for selecting at least one of the receiving planar antenna elements 14 of the array antenna 16, and a receiving circuit 24 for receiving an electric signal from the selected receiving antenna element 14 via the reception selecting circuit 22.

In the illustrated embodiment, the transmission selecting circuit 18 is so constructed as to select from among plural transmitting planar antenna elements 12 of the array antenna 16, two transmitting planar antenna elements 12 connected together by a single feeder line 26. Similarly, the reception selecting circuit 22 is constructed so as to select from among plural receiving planar antenna elements 14 of the array antenna 16, two receiving planar antenna elements 14 connected together by a single feeder line 26.

Figure 2:
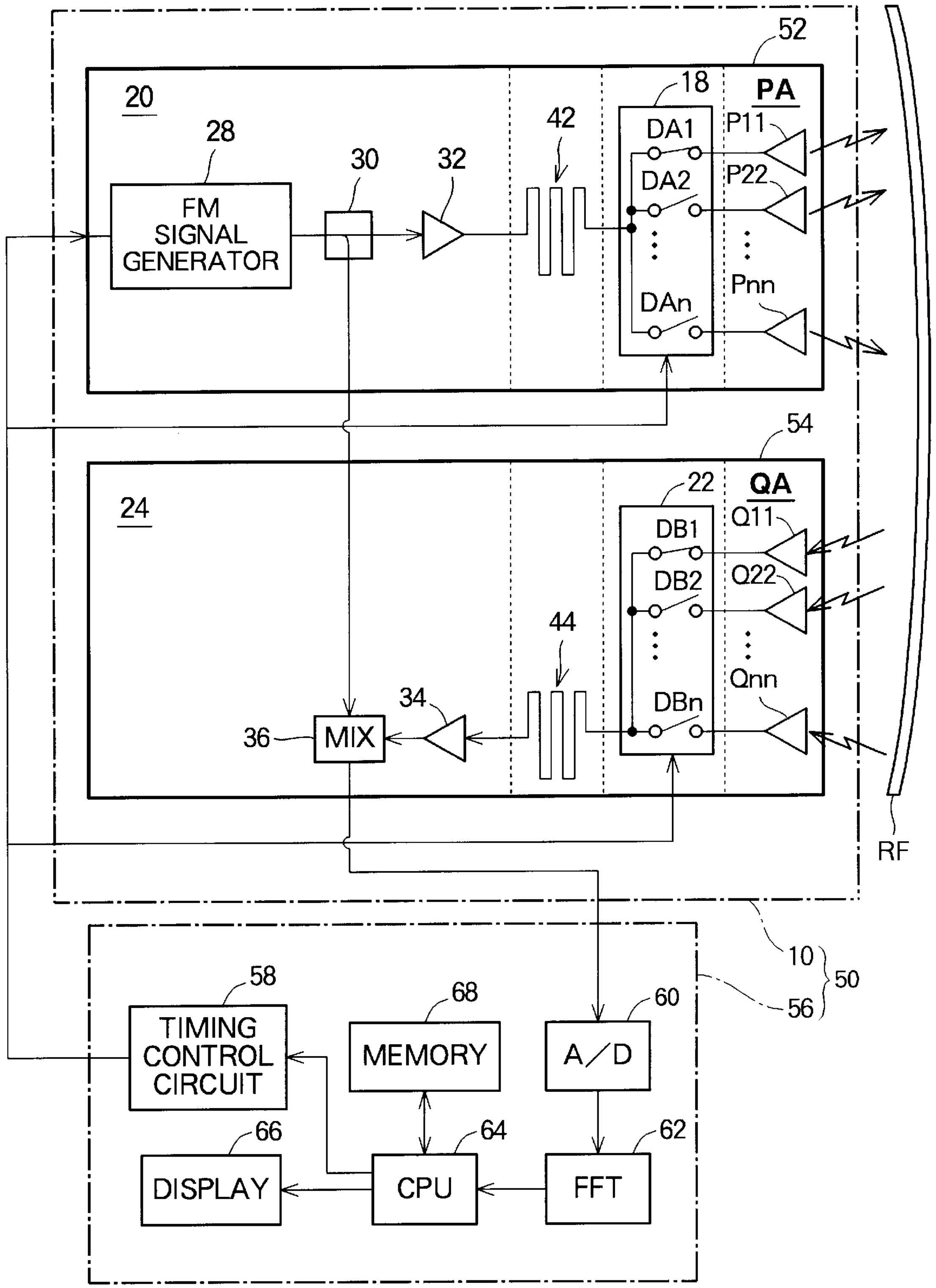
FIG. 2 is a block diagram showing the general construction of a radar system incorporating therein the antenna device for use on a motor vehicle.

The transmitting circuit 20 includes an FM signal generator 28 (FIG. 2), a coupler 30 (FIG. 2), and a high-frequency amplifier 32. On the other hand, the receiving circuit 24 includes a high-frequency amplifier 34 and a mixer 36 (FIG. 2). The array antenna 16 is comprised of a plurality of identical rectangular patches P1*a*–Pna, P1*b*–Pnb, Q1*a*–Qna and Q1*b*–Qnb ("n" is an integral number larger than two).

The transmission selecting circuit 18 includes a plurality of PIN diodes DA1–DAn having anodes connected together. Similarly, the reception selecting circuit 22 includes a plurality of anode-coupled PIN diodes DB1–DBn.

The array antenna 16, the transmission selecting circuit 18, the transmitting circuit 20, the reception selecting circuit 22 and the receiving circuit 24 are formed on a single board 38. The board 38 is composed of a first dielectric substrate 38A, a conductive earth plate 38B and a second dielectric substrate 38C laminated one above another in the order named. The feeder lines 26, the dielectric substrate 38A and the earth plate 38B jointly form microstrip lines 40. The rectangular patches P1*a*–Pna, P1*b*–Pnb, Q1*a*–Qna, Q1*b*–Qnb, the dielectric substrate 38A and the earth plate 38B jointly form rectangular patch antennas (microstrip antennas) as planar antenna elements.

The planar antenna elements containing the rectangular patches P1*a*–Pna, P1*b*–Pnb constitute the transmitting planar antenna elements 12, while the planar antenna elements containing the rectangular patches Q1*a*–Qna, Q1*b*–Qnb constitute the receiving planar antenna elements 14.

The transmitting planar antenna elements 12 and the receiving planar antenna elements 14, that are composed of the rectangular patch antennas, are arranged in staggered relation such that each of the transmitting planar antenna elements 12 and a respective adjacent one of the receiving planar antenna elements 14 are disposed diagonally with each other. With this staggered arrangement, since the adjacent planar antenna elements 12, 14 come close to each other at corners alone, the distance between the adjacent planar antenna elements 12, 14 (center distance) is larger than that in the conventional matrix arrangement in which adjacent planar antenna elements come close to one another at sides and corners. By virtue of the large center distance, the adjacent planar antenna elements 12, 14 are unlikely to cause interference and, hence, have an increased antenna efficiency.

In addition to the advantageous staggered antenna pattern described above, the transmitting planar antenna elements 12 are arranged in parallel rows, and the antenna elements 12 in each antenna row are interconnected by a single feeder line 26 for enabling series feeding of an electric signal to the antenna elements 12. Similarly, the receiving planar antenna elements 14 are arranged in parallel rows, and the antenna elements 14 in each antenna row are interconnected by a single feeder line 26 for enabling series feeding of a received electric signal from the antenna elements 14.

With the planar antenna elements 12, 14 and the associated feeder lines 26 thus arranged, for each antenna row, the radiation characteristics of the transmitting or receiving planar antenna elements 12 or 14 can be controlled.

The PIN diodes DA1–DAn of the transmission selecting circuit 18 jointly form a PIN diode array in which each of the PIN diode DA1–DAn is located on a respective one of plural branch portions in a delay circuit 42 which forms a feeder line extending from the transmitting circuit 20 to the transmission selecting circuit 18. The PIN diodes DA1–DAn, when they are turned ON and OFF by switching between forward bias and reverse bias, can be used as switches which function to selectively activate two transmitting antenna elements 12 connected to each of the branch portions of the feeder line.

Similarly, the PIN diodes DB1–DBn of the reception selecting circuit 22 jointly form a PIN diode array in which each of the PIN diode DA1–DAn is located on a respective one of plural branch portions in a delay circuit 44 which forms a feeder line extending from the receiving circuit 24 to the reception selecting circuit 22. The PIN diodes DB1–DBn, when they are turned ON and OFF by switching between forward bias and reverse bias, can be used as switches which function to selectively activate two transmitting antenna elements 14 connected to each of the branch portions of the feeder line.

The array antenna 16, the transmission selecting circuit 18 and the reception selecting circuit 22 are formed in the same board 38 to form a unitary or integral structure, and so it is possible to increase the durability and reliability of these parts and to reduce the size of the antenna device 10. In addition, the individual planar antenna elements 12, 14 of the antenna array 16 are fixedly mounted on the board 38 so that the relative position between the transmitting planar antenna elements 12 and the receiving planar antenna elements 14 remains unchanged even when the board 38 is subjected to vibrations. This may further increase the reliability of the antenna device 10. It may be appreciated that the antenna device of this invention is particularly advantageous when used in a radar apparatus for use on an automobile which is subjected to severe vibrations.

FIG. 2 shows in block diagram a vehicle-mounted radar apparatus 50 in which the antenna device 10 of the present invention is incorporated as a primary radiator. In this figure, the PIN diodes DA1–DAn, DB1–DBn are shown in the form of an equivalent circuit. The illustrated vehicle-mounted radar apparatus is an aperture antenna and includes a secondary radiator composed of a reflector RF for changing or switching the direction of beams. The reflector RF may be replaced by a lens (not shown).

The vehicle-mounted radar apparatus 50 is comprised of a transmitter section 52, a receiver section 54, and a processing section 56 for controlling operation of the transmitter and receiver sections 52, 54 and processing a signal containing information about an obstacle (target) to provide an appropriate warning to the driver. The transmitter section 52 and the receiver section 54 are formed by the antenna device 10 shown in FIG. 1.

The transmitter section 52 is composed of a transmitting circuit 20, a delay circuit 42, a transmission selecting circuit 18 including PIN diodes DA1–DAn, and a planar array antenna section PA including a group of patches P11–Pnn. The transmitting circuit 20 includes an FM signal generator 28, a coupler 30, and a high-frequency amplifier 32.

On the other hand, the receiver section 54 is composed of a receiving circuit 24, a delay circuit 44, a reception selecting circuit 22 including PIN diodes DB1–DBn, and a planar array antenna section QA including a group of patches Q11–Qnn. The receiving circuit 24 includes a mixer 36 and a high-frequency amplifier 34.

The transmitting circuit 20 and the delay circuit 42 of the transmitter section 52 respectively correspond to the transmitting circuit 20 and the delay circuit 42 of the antenna device 10 shown in FIG. 1. The patch P11 of the patch group corresponds to two rectangular patches P1a and P1b that, as shown in FIG. 1, are connected together by the feeder line 26. The patch Pnn correspond to two rectangular patches Pna and Pnb that, as shown in FIG. 1, are connected together by the feeder line 26.

Similarly, the receiving circuit 24 and the delay circuit 44 of the receiver section 54 respectively correspond to the receiving circuit 24 and the delay circuit 44 of the antenna device 10 shown in FIG. 1. The patch Q11 corresponds to two rectangular patches Q1*a* and Q1*b* that, as shown in FIG. 1, are connected together by the feeder line 26. The patch Qnn corresponds to two rectangular patches Qna and Qnb that, as shown in FIG. 1, are connected together by the feeder line 26.

The FM signal generator 28 of the transmitter section 52 generates an FM signal with a frequency varying into the shape of a sawtooth in synchronization with a control signal fed from a timing control circuit 58 of the processing section 56. In the embodiment being described, the frequency of the FM signal is about 60 GHz, for example. Part of the FM signal is supplied to the transmitting circuit 18 through the coupler 30, high-frequency amplifier 32 and delay circuit 42.

Through any of the PIN diodes DA1–DAn which are switched ON or OFF based on the control signal fed from the timing control circuit 58 of the processing section 56, the FM signal is radiated outwardly of a vehicle via a corresponding one of the patch group P11–Pnn.

The FM signal radiated from the patches is reflected by an external object (obstacle). The reflected FM signal is received by the patches Q11–Qnn and then fed to one input terminal of the mixer 36 via the one of the PIN diodes DB1–DBn placed in the ON state based on the control signal fed from the timing control circuit 58 of the processing section 56, and through the delay circuit 44 and high-frequency amplifier 34.

The other input terminal of the mixer 36 is supplied via the coupler 30 with part of the FM signal generated by the FM signal generator 28. Thus, the mixer 36 outputs a beat signal of frequency increasing in correspondence with a distance to the object which caused the signal reflection.

The beat signal is fed to the processing section 56. In the processing section 56, the beat signal is first fed to an A/D convertor circuit 60 where it is converted into a digital signal. The beat signal converted into a digital form is resolved into a frequency spectrum in a fast Fourier transformer (FFT) circuit 62. A central processing unit (CPU) 64 detects information about the obstacle or target by analyzing the beat signal resolved into a frequency spectrum and displays the detected information on the display screen of a display 66. Reference numeral 68 designates a memory for storing a control program for controlling the operation of the CPU 64 and other data.

By placing any one of the PIN diodes DA1–DAn in the ON state and thus selecting a corresponding one of the patches P11–Pnn, it becomes possible for the planar array antenna section PA to radiate a main beam in a direction corresponding to their respective patches (respective transmitting planar antenna elements).

Alternatively, when two or more PIN diodes DA1–DAn are placed into the ON state to select corresponding two or more patches P11–Pnn, beams from the two or more sets of patches (FIG. 1) are synthesized. In this instance, the planar array antenna section PA radiates a main beam in a direction different from that of the case in which only one patch set is selected. This further enables more minute switching of main beam directions and improves the bearing resolution.

Since the transmitting planar antenna elements 12 and the receiving planar antenna elements 14 are provided separately, it is possible to separate the transmitter section 52 and the receiver section 54 in an effort to lower the level of deterioration of the reception sensitivity due to leakage of part of a received signal to the transmitter section 52, as compared to the case wherein each planar antenna element is used for both transmission and reception, and signal separation is effected via a circulator.

By placing any of the PIN diodes DB1–DBn in the ON state to select a corresponding one of the patches Q11–Qnn, the planar array antenna section QA is able to receive a reflected beam from a direction corresponding to the selected set of the patches. This enables more minute switching of beam receiving directions, which will insure wide reception of beams reflected by the obstacle or target and accurate detection of the configuration of the target.

Furthermore, separate provision of the transmitting and receiving planar antenna elements 12, 14 is effective to narrow the apparent beam angle. While the relation between the direction and intensity of beam radiation of an antenna is generally referred to as directivity, such directivity also refers to the relation between the direction and intensity of beam absorption. When a single planar antenna element is used for both transmission and reception, the direction of a beam (main beam) radiated from the antenna element coincides with the direction of a beam received by the antenna element. By contrast, when the transmitting planar antenna elements 12 and receiving planar antenna elements 14 are provided separately as in the present invention, the directions of beams radiated by the transmitting planar antenna elements 12 (directivities of the transmitting planar antenna elements) are slightly displaced or offset from the directions of beams received by the receiving planar antenna elements 14 (directivities of the receiving planar antenna elements), thereby enabling the detection of an object (obstacle) which lies within an overlapped range of those directions. As a result, the apparent width of the beams can be narrowed, and the directional or bearing resolution can also be improved in this respect.

Figure 3A:
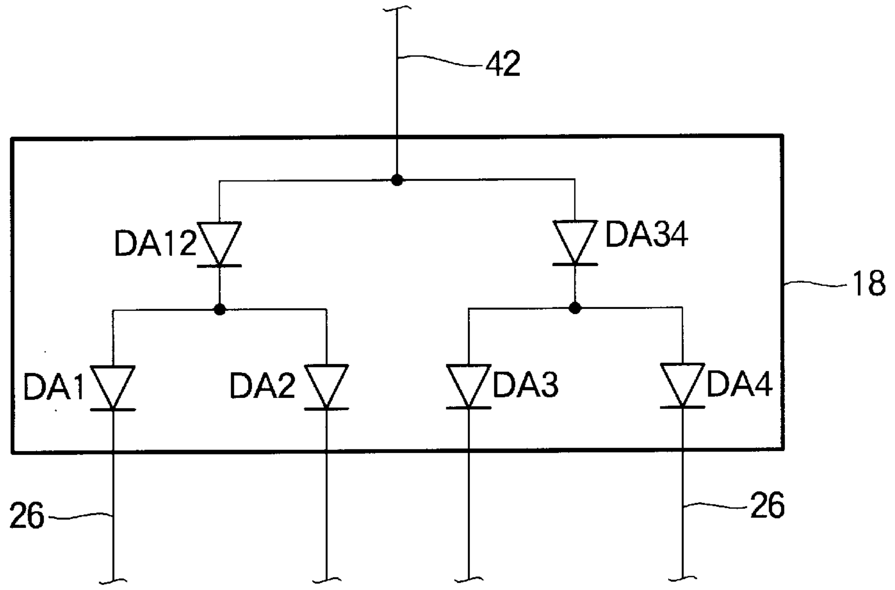
FIG. 3A is a circuit diagram showing a transmission selecting circuit of the antenna device.

FIG. 3A is a circuit diagram showing a structural example of the transmission selecting circuit 18 which supplies an electric signal from the delay circuit 42 to the feeder line connected to one of the PIN diodes DA1–DA4. As shown in this figure, the delay circuit 42 is blanched into two parts (branched portions) each of which includes one PIN diode DA12, DA34 disposed thereon. A signal line extending from a cathode of the PIN diode DA12 is branched into two parts (branched portions) each of which includes one PIN diode DA1, DA2 disposed thereon. Similarly, a signal line extending from a cathode of the PIN diode DA34 is branched into two parts (branched portions) each of which includes one PIN diode DA3, DA4 disposed thereon.

With this symmetrically branched hierarchical circuit structure, the distance from the branched point of the delay circuit 42 to the individual feeder lines 26 is made constant, and so it becomes possible to a supply signal from the delay circuit 42 to the respective feeder lines 26 in the same phase.

Figure 3B:
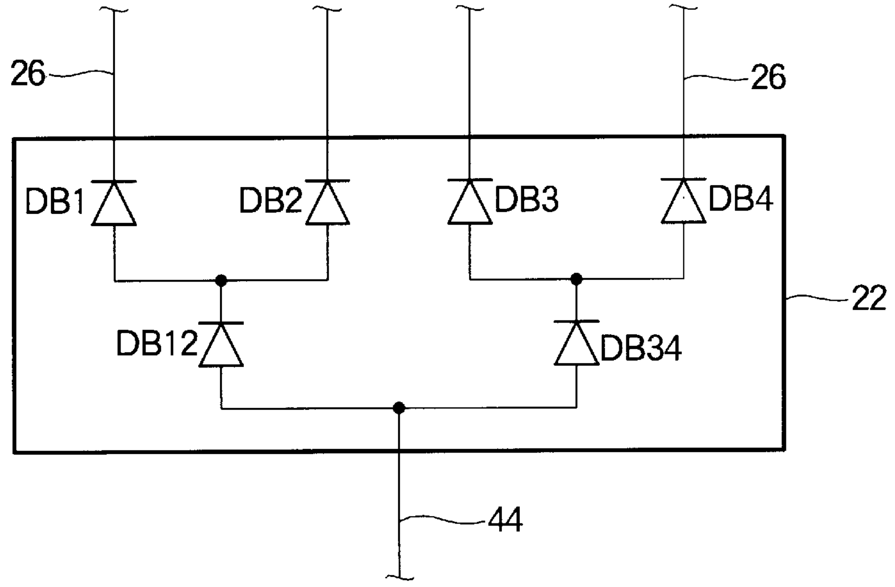
FIG. 3B is a circuit diagram showing a reception selecting circuit of the antenna device.

FIG. 3B is a circuit diagram showing a structural example of the reception selecting circuit 22 which supplies an electric signal from any of the feeder lines 26 via a corresponding one of the PIN diodes DB1–DB4 to the delay circuit 44. The delay circuit 42 is blanched into two parts (branched portions) each of which includes one PIN diode DB12, DB34 disposed thereon. A signal line extending from a cathode of the PIN diode DB12 is branched into two parts (branched portions) each of which includes one PIN diode DB1, DB2 disposed thereon. Similarly, a signal line extending from a cathode of the PIN diode DB34 is branched into two parts (branched portions) each of which includes one PIN diode DB3, DB4 disposed thereon.

With this symmetrically branched hierarchical circuit structure, the distance from the branched point of the delay circuit 44 to the individual feeder lines 26 is made constant, and so it becomes possible to supply signals from the respective feeder lines 26 to the delay circuit 44 in the same phase.

The PIN diodes may be replaced by a high-speed switching transistor such as a HEMT (High Electron Mobility Transistor).

Figure 4:
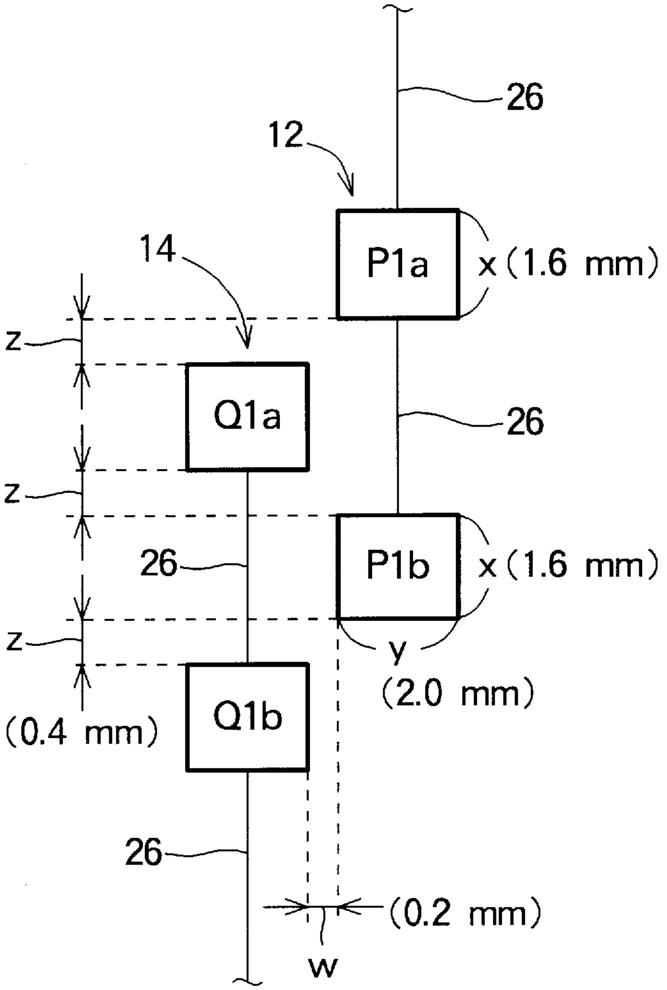
FIG. 4 is an enlarged plan view showing the arrangement of rectangular patches of an array antenna.

FIG. 4 illustrates on enlarged scale the staggered arrangement pattern of the rectangular patches P1*a*, P1*b*, Q1*a*, Q1*b* of the array antenna 7 of the antenna device 10 shown in FIG. 1.

The rectangular patches P1*a*, P1*b*, Q1*a*, Q1*b* all have the same size and, more specifically, they are 1.6 mm in vertical extent or height x and 2.0 mm in horizontal extent or width y. The patch spacing z in the vertical direction between each of the rectangular patches P1*a*, P1*b* (transmitting planar antenna elements 12) and an adjacent one of the rectangular patches Q1*a*, Q1*b* (receiving planar antenna elements 14) is 0.4 mm. The patch spacing w in the horizontal direction between each of the rectangular patches P1*a*, P1*b* (transmitting planar antenna elements 12) and an adjacent one of the rectangular patches Q1*a*, Q1*b* (receiving planar antenna elements 14) is 0.2 mm.

As in the embodiment being described, when the frequency of the FM signal is given by 60 GHz, the free space wavelength $\lambda$ of the same FM signal should be 5 mm. The horizontal patch spacing w between the adjacent transmitting and receiving antenna elements 12, 14 ranges preferably from abut 4% (0.2 mm) to about 8% (0.4 mm) of the free space wavelength $\lambda$. By virtue of the staggered arrangement with particular spacing of the planar antenna elements 12, 14, a desired high level of antenna integration density of the array antenna 16 can be maintained, while the leakage of radio frequency wave energy (represented by an electric signal) from one transmitting planar antenna element 12 to an adjacent receiving planar antenna element 14 is significantly reduced.

It was proved by experiments that in a dual element series feeding operation performed by the arrangement shown in FIGS. 2 and 4, and in a triple element series feeding operation involving the use of three antenna elements (not shown) connected in series, the leakage of radio frequency energy from each of the transmitting planar antenna elements to a respective adjacent receiving planar antenna element can be reduced by about 12 dB, as compared to the case where the planar antenna elements are arranged in a conventional matrix or rectangular array pattern.

As described above, by virtue of the staggered arrangement of the planar antenna elements, it becomes possible to reduce the interference between the adjacent antenna elements and thus improve the antenna efficiency of the planar antenna elements. Accordingly, when the antenna device equipped with high efficiency planar antenna elements of the present invention is used in a vehicle-mounted radar apparatus, such as shown in FIG. 2, vehicle battery power consumption can greatly be reduced.

The antenna device 10 shown in FIG. 2 may be mounted on the front end, rear end or four corners of a vehicle, while the processing section 56 is placed in any appropriate position inside the vehicle. The receiving circuit 24 shown in FIG. 1 may be composed of a processing section 56, a high-frequency amplifier 34 and a mixer 36, while provision of the high-frequency amplifier 34 is not always needed. The antenna device of the present invention may also be applied to an interior radio-LAN system. It may also be readily appreciated that the selecting circuits 18, 22, the transmitting circuit 20, the receiving circuit 24, etc. may be combined or otherwise integrated to form a monolithic microwave integrated circuit (MMIC), thus providing a considerable reduction in size of the antenna device.

Obviously, various minor changes and modifications of the present invention are possible in the light of the above teaching. It is therefore to be understood that within the scope of the appended claims the invention may be practiced otherwise than as specifically described.

What is claimed is:

1. An antenna device, comprising:

an array antenna comprised of a plurality of transmitting planar antenna elements and a plurality of receiving planar antenna elements;

a transmission selecting circuit for selecting at least one of said transmitting planar antenna elements;

a transmitting circuit for transmitting an electric signal to said selected at least one transmitting planar antenna element via said transmission selecting circuit;

a reception selecting circuit for selecting at least one of said receiving planar antenna elements; and a receiving circuit for receiving a received electric signal from said selected at least one receiving planar antenna element via said reception selecting circuit, wherein said transmitting planar antenna elements and said receiving planar antenna elements are arranged in staggered relation such that each of said transmitting planar antenna elements and an adjacent one of said receiving planar antenna elements are disposed diagonally with each other.

2. An antenna device according to claim 1, wherein said transmitting and receiving planar antenna elements are each composed of a rectangular patch antenna.

3. An antenna device according to claim 2, wherein said transmitting planar antenna elements are arranged in rows, the transmitting planar antenna elements in each transmitting antenna row being connected in series by a single feeder line for enabling series feeding of said electric signal, wherein said receiving planar antenna elements are arranged in rows, the receiving planar antenna elements in each receiving antenna row being connected in series by a single feeder line for enabling series feeding of said received signal, and wherein the patch spacing between one of the transmitting planar antenna elements in said each transmitting antenna row and an adjacent one of the receiving planar antenna elements in said each receiving antenna row ranges from about 4% to about 8% of a free space wavelength corresponding to a frequency of said electric signal.

4. An antenna device according to claim 1, wherein said transmission selecting circuit is connected to said transmitting circuit by a feeder line having a plurality of branched portions and includes a PIN diode array comprised of a plurality of PIN diodes each disposed on a corresponding one of said branched portions of said feeder line.

5. An antenna device according to claim 1, wherein said reception selecting circuit is connected to said receiving circuit by a feeder line having a plurality of branched portions and includes a PIN diode array comprised of a plurality of PIN diodes each disposed on a corresponding one of said branched portions of said feeder line.

6. An antenna device as in claim 1 mounted on a vehicle.

7. An antenna device as in claim 6 wherein the vehicle is an automobile.

* * * * *